UNITED STATES PATENT OFFICE.

WILLIAM HENRY PURDY, OF BROOKLYN, ASSIGNOR, BY MESNE ASSIGNMENTS, TO THE UNITED STATES SILVERED STEEL COMPANY, OF GREENBURG, NEW YORK.

PROCESS OF PURIFYING IRON AND STEEL.

SPECIFICATION forming part of Letters Patent No. 322,558, dated July 21, 1885.

Application filed November 18, 1884. (No specimens.)

*To all whom it may concern:*

Be it known that I, WILLIAM HENRY PURDY, a citizen of the United States, residing at Brooklyn, Kings county, New York, have invented new and useful Improvements in Process of Purifying Iron and Steel, of which the following is a specification.

The purpose of my invention is to purify high steel or white iron of the kind used in casting car-wheels and other articles, whereby the native impurities of the metal are removed and its quality improved by a simple and comparatively inexpensive mode of procedure.

My invention consists in the process hereinafter fully described, and definitely pointed out in the claims annexed to this specification.

In fusing the metal either in a ladle, a crucible, or in a suitable furnace of any kind I employ a composition consisting of one pound of red lead, litharge, and cinnabar, in the proportions substantially of one pound each of the two first named and one-fourth of a pound of the last. To these I add three pounds of loam, molding-sand, or a similar material, and one gallon of water, the whole being stirred until a thorough mechanical mixture is obtained.

With this composition, which is in a plastic state, I either coat the interior of the ladle, crucible, or other vessel in which the metal is fused, or I apply it to the exterior of such metal in any convenient manner, such as smearing it thereon or dipping the metal in the mixture.

The ladle or the metal, or both, being prepared in this manner, the iron or steel is melted in the usual manner. Upon reaching a red heat, the substances entering into the composition combine with the impurities of the metal and are thrown to the surface. The litharge having the property of readily combining with silicic acid at high temperatures, and the red lead or minium evolving oxygen at a red heat, the melted metal is thrown into ebullition, the silicon, sulphur, and phosphorus are rapidly eliminated, and a certain percentage of the carbon combines with the oxygen of the minium, forming carbonic oxide. The molten metal is allowed to remain in the ladle or crucible for about two to three hours, and may then be run into the mold, producing a pure and remarkably tough fine-grained metal.

It should be noted that as red lead or minium parts with three atoms of oxygen when brought to a red heat, and is thus converted into litharge, the latter may be omitted in forming the compound, and red lead used instead.

The properties I have stated are those preferred in carrying this invention into practice; but they are by no means strictly confined to the relative quantities stated, as the latter may be varied considerably without departing from my invention.

The composition may be used in either or both of the ways described—viz., by lining the ladle or crucible therewith or by smearing it upon the metal. When applied to the ladle or other vessel, the latter may be used several times before it becomes necessary to renew the lining.

I am aware that red lead and litharge have been heretofore used in various processes of purifying metals, wherein they have been each combined with various other substances. In no instance, however, have either or both been combined and used with the ingredients and in the manner hereinbefore set forth. This application is a division of the application filed by me of even date, Serial No. 148,247.

What I claim is—

1. The process hereinbefore described for purifying iron and steel, said process consisting in melting such metal in intimate contact with a compound consisting of red lead or minium and cinnabar mingled with molding-sand and water, in substantially the proportions named.

2. The process hereinbefore described for purifying iron or steel, said process consisting in melting such metals in a ladle, crucible, or other vessel lined with a compound of red lead or minium and cinnabar mingled with molding-sand and water, in substantially the proportions named.

In testimony whereof I affix my signature in presence of two witnesses.

WILLIAM HENRY PURDY.

Witnesses:
JAMES L. NORRIS,
JOS. L. COOMBS.